Jan. 9, 1951  G. A. LOHR  2,537,069

PHOTOGRAPHIC LETTERING DEVICE

Filed Aug. 17, 1945  5 Sheets-Sheet 1

Inventor
George A. Lohr

By Walter W. Burns
Attorney

Jan. 9, 1951   G. A. LOHR   2,537,069
PHOTOGRAPHIC LETTERING DEVICE
Filed Aug. 17, 1945   5 Sheets-Sheet 2

Inventor
George A. Lohr
By Walter W. Burns
Attorney

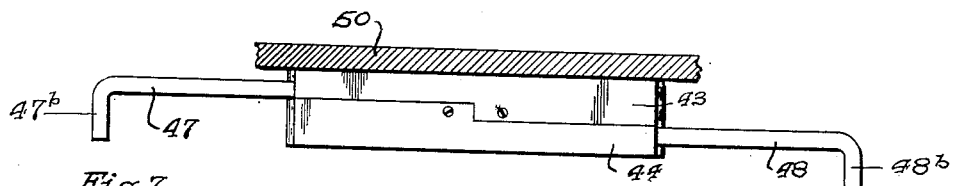
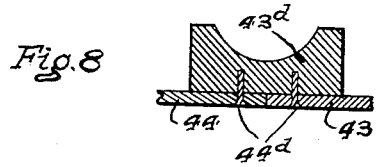
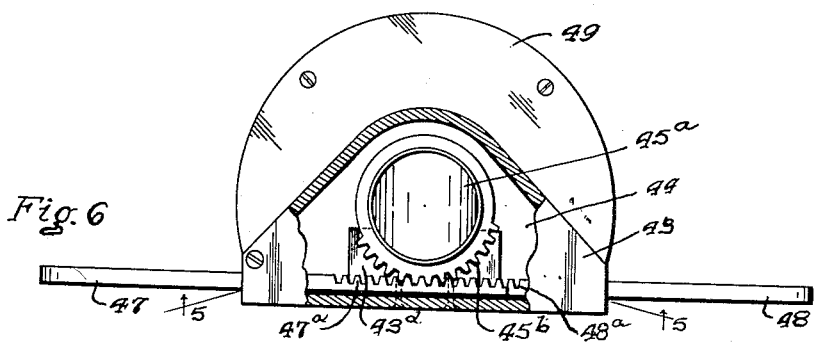
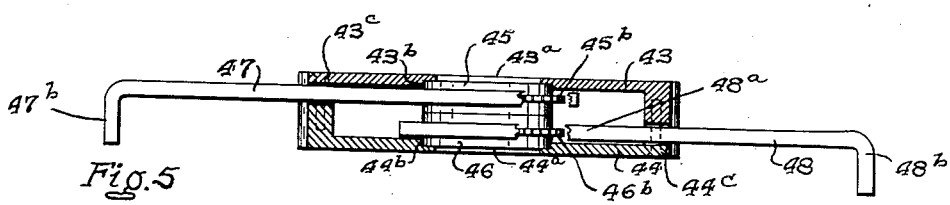

Jan. 9, 1951            G. A. LOHR            2,537,069
PHOTOGRAPHIC LETTERING DEVICE
Filed Aug. 17, 1945            5 Sheets-Sheet 4
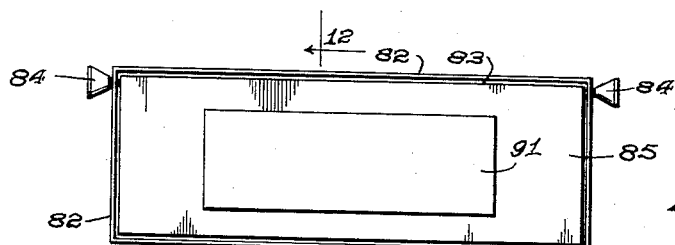
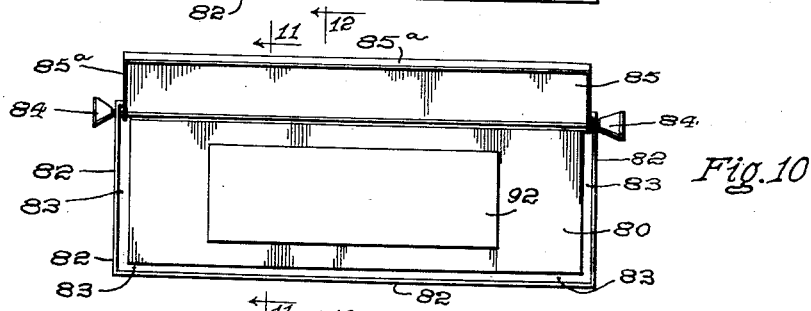
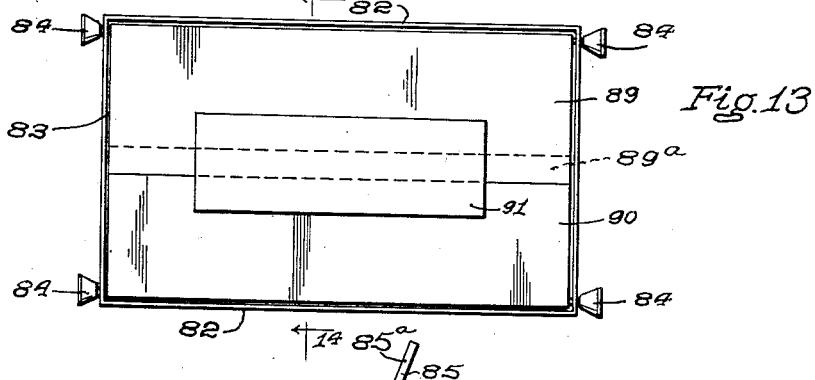
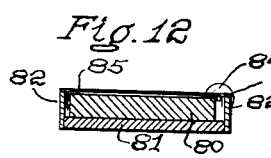
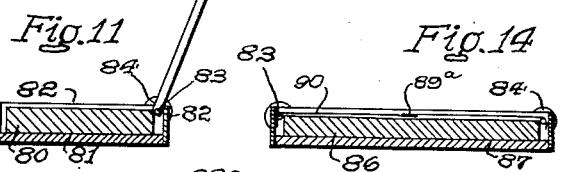
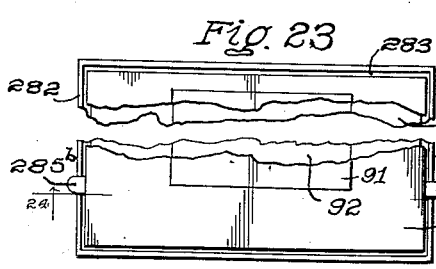
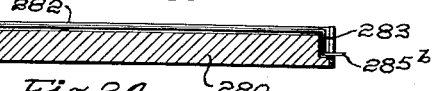
Inventor
George A. Lohr
By Walter W. Burns
Attorney Jan. 9, 1951            G. A. LOHR            2,537,069
PHOTOGRAPHIC LETTERING DEVICE
Filed Aug. 17, 1945                          5 Sheets-Sheet 5
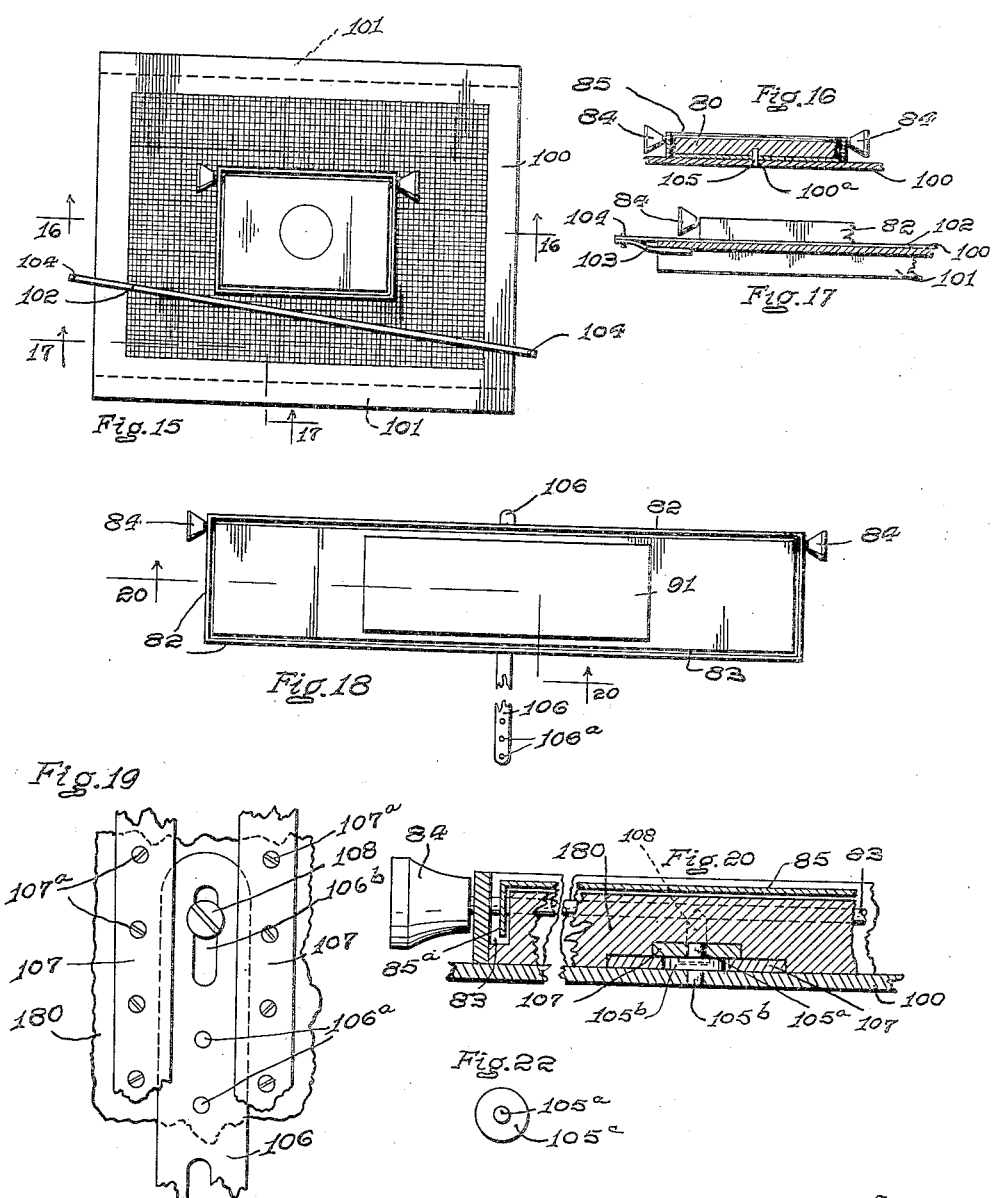
Inventor
George A. Lohr
By Walter W. Burns
Attorney Patented Jan. 9, 1951

2,537,069

UNITED STATES PATENT OFFICE 2,537,069

PHOTOGRAPHIC LETTERING DEVICE

George A. Lohr, Arlington, Va.

Application August 17, 1945, Serial No. 611,108

3 Claims. (Cl. 95—4.5)

This invention relates to photography and has particular reference to a method of and means for quickly reproducing letters or other characters photographically.

In the practice of commercial art, one of the problems of the producer is to reproduce letters or other characters in design as quickly as possible. Due to the fact that this is usually done by hand and also to the fact that great skill and patience is required there is often much time consumed in placing the lettering on the sheet after the picture or other motif has been completed.

The primary object of this invention is the provision of a process and apparatus whereby the photographic lettering in design may be accomplished in a very rapid and efficient manner.

Another object of the invention is the provision of a process whereby a photographic lettering lay-out and the printing thereof may be made with the same equipment.

Another object of the invention is the provision of an apparatus whereby a photographic lettering lay-out can be made and an accurate printing made therewith to accurately register with the lay-out.

Another object of the invention is the provision of an apparatus whereby a photographic negative may be used to produce, by the same characters, enlarged printings, printings having increased heights or widths or italicized printings— any or all in the same design.

Still another object of the invention is the provision of an apparatus wherein a regular or an irregular lay-out of letters or other characters may be made from projections of the characters, the lay-out being moved to the desired positions to fit the letters or other characters to the design.

Still another object of the invention is the provision of an improved photographic apparatus wherein any degree of italicization of letters or other characters may be reproduced by use of the same lenses and the same negative.

Still another object of the invention is the provision of an apparatus whereby a lay-out sheet after having the lay-out completed, may be reproduced as laid out, by registration of a sensitized surface with the lay-out.

Still another object of the invention is the provision of an apparatus wherein is provided an enlarging lens, a negative support which is movable in one or two dimensions in a plane substantially normal to the lens axis and has a lay-out sheet in the field of projections of the lens, which lay-out sheet is provided with a support having a sensitized surface normally shielded from the light during the laying-out operation but in position to be printed to produce a photograph in accord with the lay-out.

Still another object of the invention is the provision of a photographic apparatus having an enlarging lens, a negative having a plurality of characters thereon with means for moving the negative relative to the lens axis and a chart and indicator to indicate the letter, or other character, which is in position to the reproduced.

Another and still further object of the invention is the provision of a photographic apparatus wherein the axis of the enlarging lens may remain in one position and a lay-out frame having a space for a sensitized surface may be moved to bring different portions of the lay-out sheet within the projected field of the lens.

Another and still further object of the invention is the provision of an improved method for photographically reproducing letters and other characters wherein light is passed through a negative, with or without astigmatizing equipment to distort the characters, through a lens and the characters projected onto a freely movable lay-out support having a sensitized surface which may be covered or exposed to the light to project a reproduction of the characters in accordance with the lay-out.

Still another object of the invention is the provision of a photographic apparatus wherein letters or other characters are projected on a lay-out sheet, underneath which is a sensitized surface upon which the characters may be printed by swinging the lay-out sheet out of the field and exposing the sensitized sheet therebeneath, to print the characters on the latter in accordance with the lay-out sheet.

Other and further objects will be apparent to those skilled in the art from a reading of the complete specification in connection with the drawing.

Referring to the drawing wherein is illustrated an embodiment of the invention,

Fig. 5 is a detail sectional view showing the astigmatizing lenses and their holder in place, taken on the line 5—5 of Fig. 6.

Fig. 6 is a plan view of the astigmatizing lens holders and their operating mechanisms, showing portions broken away for purposes of illustration.

Fig. 7 is an elevational sectional view of the astigmatizing lens mechanism, taken forward of the astigmatizing lens housing.

Fig. 8 is a detail of the rack guiding block of the astigmatizing mechanism.

Fig. 9 is a plan view of the lay-out and sensitized surface holder with the lay-out plate in closed position.

Fig. 10 is a view similar to Fig. 9 but with the lay-out plate in open position.

Fig. 11 is a cross section on the line 11—11 of Fig. 10.

Fig. 12 is a cross section on the line 12—12 of Fig. 9.

Fig. 13 is a modified form having a two-part lay-out plate.

Fig. 14 is a cross section on the line 14—14 of Fig. 13.

Fig. 15 is a plan view of a table showing a modified form of the invention.

Fig. 16 is a sectional view on the line 16—16 of Fig. 15.

Fig. 17 is a detail sectional view on the line 17—17 of Fig. 15.

Fig. 18 is a plan view of another modification.

Fig. 19 is a bottom detail view of the means for fastening the radius strip to the lay-out unit.

Fig. 20 is a detail enlarged sectional view on the line 20—20 of Fig. 18.

Figs. 21 and 22 are respectively elevational and plan views of the pivot pin for the radius strip.

Fig. 23 is a plan view of another form of the invention.

Fig. 24 is a sectional view on the line 24—24 of Fig. 23.

Similar reference characters refer to the same or similar parts throughout the specifications and drawing.

Figure 1:
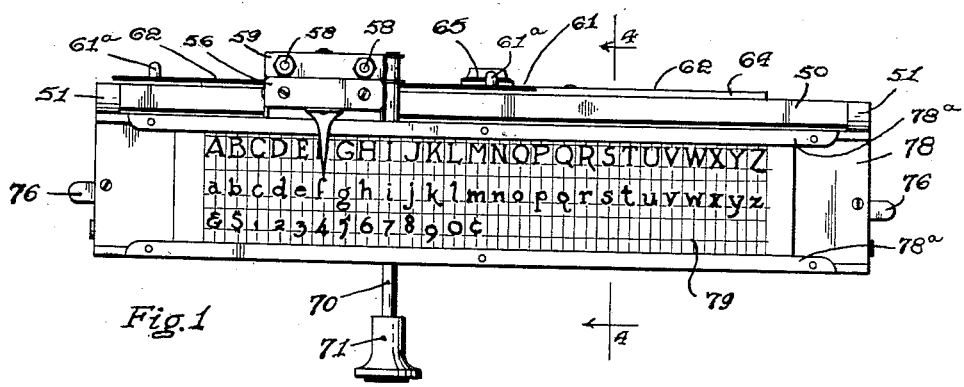
Fig. 1 is a front view of that portion of my invention which holds and moves the negative from which the reproduction is made.
Figure 2:
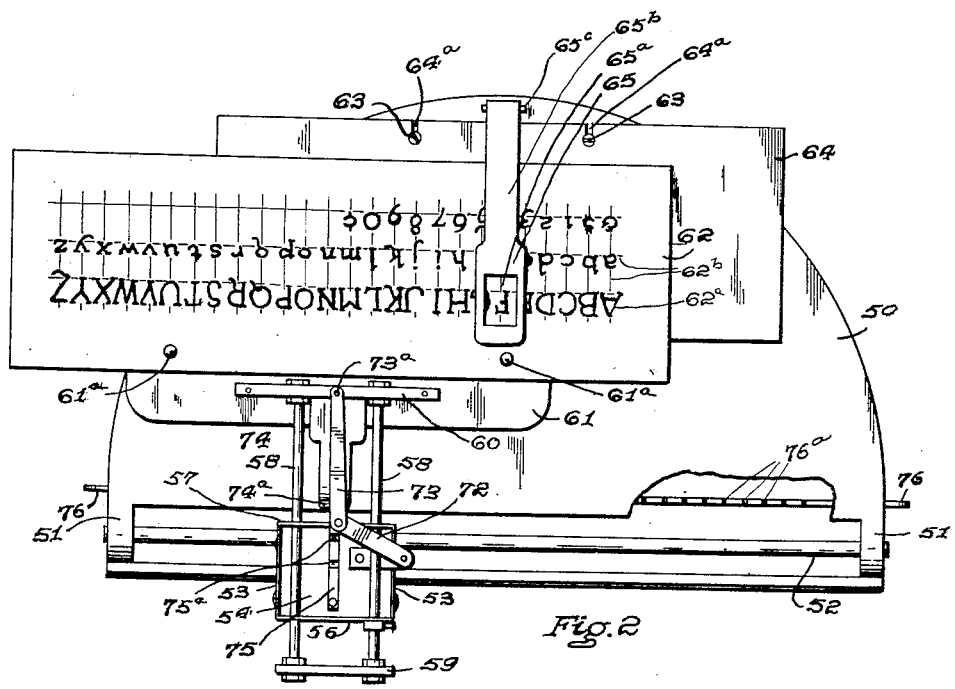
Fig. 2 is a top plan view of the structure of Fig. 1.
Figure 4:
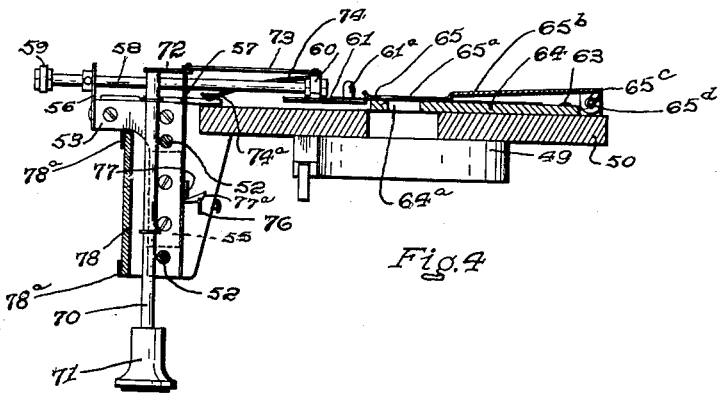
Fig. 4 is a sectional view on the line 4—4 of Fig. 1.
Figure 3:
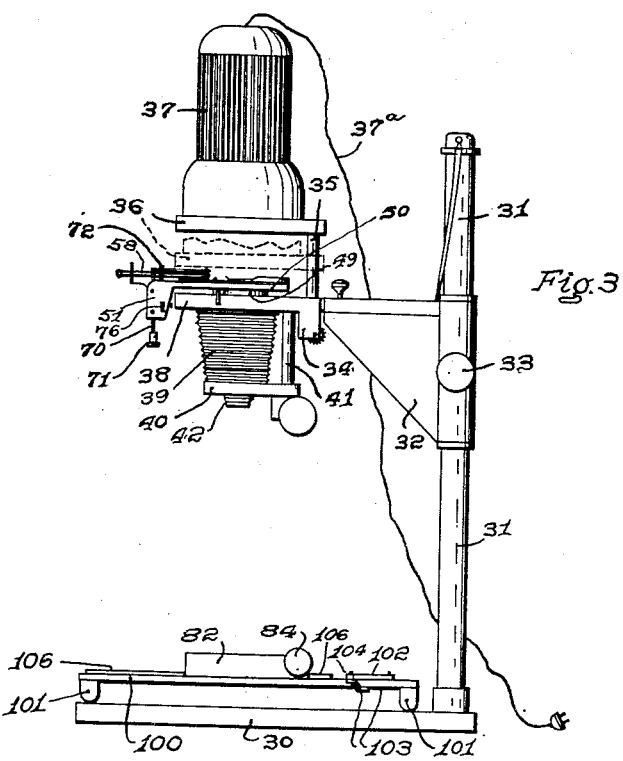
Fig. 3 is an elevational side view of the invention as used with an enlarging machine.

Referring particularly to Figs. 1, 2, 3 and 4, 30 represents the base of an enlarging machine and 31 the upright supporting tube for the support of the source of light, the lens and cooperating parts.

Slidably mounted on the upright 31 is a bracket member 32 which has a knob and screw 33 for securing the bracket member 32 in any desired vertical position. Mounted at the end of the bracket 32 is a block 34 having an adjustable rod 35 mounted for vertical sliding therein. At the top of the rod 35 is a frame 36 which carries a housing 37 which latter carries a source of light such as an electric light which is supplied by current by way of the cord 37a. When in use the frame 36 and the housing 37 is lowered from the position shown in Fig. 3 to the dotted line position.

Secured to the block 34 is a lower frame 38 which has a suitable opening for the passage of light from the housing 37. Secured to the lower side of the frame 38 is a bellows 39, the lower end of which is secured to an adjustable frame member 40 which slides vertically on the rod 41.

Secured in the bottom of the frame 40 is a lens 42. All of the above described structure, a part of enlarging apparatus, is not a part, per se, of this invention, and is well known in the art. For these reasons, no further detailed description of these parts will be given.

On top of the lower frame member 38 is a two part housing having an upper member 43 and a lower member 44. Registering openings 43a, 44a are provided for the passage of light from the light source 37. Within recesses adjacent the openings 43a, 44a are recesses 43b, 44b in which the flanges of the lens cylinders 45, 46 turn freely. In the lens cylinders 45, 46 are located astigmatizing lenses, as for example cylindrical, concave lens 45a may be mounted in the cylinder 45 and a similar but convex lens in the cylinder 46. These lenses are known as plane-cylinders. These lenses should be ground so as to be neutral. The two lens cylinders 45, 46 contact each other at their adjacent edges and are so freely mounted that when the lower lens cylinder 46 is turned, the upper lens cylinder 45 will also turn.

The cylinders 45, 46 are provided with respective segmental gears 45b, 46b of such a length as to provide all of the desired rotation to give the lenses the astigmatic effect in the projection of the image on the lay-out sheet to be later described.

Mounted to freely slide in suitable slots 43c, 44c in the housing members 43, 44, are rack-rods 47, 48, the rod 47 having a rack 47a coacting with the teeth 45b and the rod 48 having a rack 48a coacting with the segmental gear 46b.

As these astigmatic lenses are mounted, the handles 47b, 48b may be on the side of the lenses toward the operative. Since the lenses 45, 46 are in contact with each other and are freely rotatable in their respective recesses 43b, 44b, and since the upper rack-rod 47 is freely movable in its slot 43c, it is clear that when the lower rack-rod 48 is pushed in or pulled out to turn the lens cylinder 46, the upper lens cylinder 45 will move with it, unless restrained by the operative holding the rod 47 against moving. A block 43d is secured to the housing 43, 44 by suitable screws 44d and furnishes a guide means for the rack bars 47, 48 when being operated.

Whenever it is desired to turn one lens relative to the other, the rod 48, or the rod 47, is held in place by one hand while the other rod is moved to produce the desired movement of its lens.

A suitable filler block 49 of a thickness equal to the housing 43, 44, is provided for support of the negative carrying means and its coacting parts, to be presently described. The housing 43, 44 and the filler block 49 are secured to the lower frame member 38 in any suitable manner as by screws.

If desired, the astigmatizing lens mechanism and the filler block 49 may be omitted.

On the upper side of the filler 49 and the housing 43, 44, is the main supporting frame member 50 which is suitably secured in place as by screws. Secured to the outer edges of the frame member 50 are side frame members 51. Extending from one frame member 51 to the other and embedded therein are guide members as the rods 52. Mounted to slide on the guide members 52 are two L-shaped carriage-supporting members 53. These carriage supporting members 53 are secured together by spacing blocks 54 and 55, to which the supporting members 53 are suitably secured, as by screws. The lower block 55, acts as a spacer between the lower ends of the L-shaped members 53. The upper spacer block 54 has at its front and rear faces, the guide plates 56, 57 which are provided with holes through which pass the guide rods 58. These guide rods 58 which are secured together at their front and rear ends with the spacing members 59, 60, move in parallel vertical planes which are perpendicular to the plane of the axes of the guide rods 52. The inner spacing member 60 also acts as a bracket to which is secured the character sheet carrying plate 61.

The plate 61 acts as a support for the character sheet 62 upon which the letters or other characters, to be reproduced, are placed. The plate 61 is provided with members as the pins 61a which coact with registering openings in the character sheet 62 to insure the proper placing of the letters with relation to the light passing through the lenses.

In preparing the sheets 62, the letters or other characters 62a are arranged in their predetermined relative positions, on large sheet, in preparation for photographing. When the letters are in position, registration marks are placed opposite them or in such places that when the negative is completed, the letters and registration marks can be projected on the lay-out sheet, to be later described.

In the illustrated embodiment, vertical center lines 62b are used on the letters 62a with a second line at right angles thereto tangent to the bottoms of the letters. However any other suitable lines or points may be used which will serve the purpose. After the letters 62a with their registration or guide lines 62b, are photographed, and the negative is obtained, the registration or guide lines 62b are covered with a transparent coating which will not transmit rays of light which will affect a sensitized surface but will transmit light which is visible to the human eye.

At the rear of the supporting frame member 50 are two screws 63. A mask member 64 has slots 64a which receive the screws 63 when the mask member 64 is put in place. The upper surface of the mask member 63 and that of the carrying plate 61 are in substantially the same plane. A pressure plate 65, having an opening 65a, is provided with an arm 65b which is pivoted to the support frame member 50 as at 65c. At the pivot 65c, is provided a light spring 65d of sufficient strength to cause the pressure plate 65 surrounding the opening 65a to press the character sheet 62 onto the mask board member 64.

In order to move the sheet carrying plate 61 and with it the character sheet 62, I have provided a single means for this purpose. By this means, it is possible to bring any one of the characters on the character sheet 62, in registry with the opening 65a of the pressure plate 65 and the opening 64a of the mask plate 64.

To the upper block 54 of the carriage, at the right side, I pivot a shaft 70 having at its lower end a turning knob 71 and at its upper end, a lever arm 72. The outer end of the lever arm 72 is pivoted to one end of a link 73 which at its other end is pivoted to the spacing member as at 73a. It will be thus clear that by turning the knob 71, the shaft 70 will operate its arm 72 and the link 73 to move the guide rods 58, forwardly or rearwardly to move the carrying plate 61 and the character sheet to bring different character groups in position to register with the openings 65a and 64a already referred to.

In order to indicate to the touch of the operator when the carriage has traveled a predetermined distance to place characters in position to be registered with the openings 65a and 64a, there is provided a means for causing a "click" in the movement to indicate to the touch of the operative that a certain distance has been moved. To the spacing member 60 is secured a spring member 74 having a turned down end portion 74a. To the block 54 is secured a bar 75 having notches 75a which are engaged by the turned-down end portion 74a already referred to. As the end 74a moves along the bar 75, when the knob 71 is turned, it engages the notches 75a and indicates the position of the front-to-rear guide rods 58.

Since the shaft 70 is journaled on the sliding carriage, the latter may be moved from side to side along the guides 52 by moving the knob 71 from one side to the other. In the side frame members 51 and parallel to the guides 52 is a "click" bar 76 having notches 76a. Secured to the block 55 is a spring member 77 having a resilient edge portion 77a which engages the notches 76a as the carriage slides along the guides 52. The notches 75a and 76a are so shallow that their respective engagement by the spring portions 74a and 77a will not stop the carriage movement but will merely make a "click" which will be felt by the operative. By this means, the operative will know when the predetermined increment of movement has been accomplished. When the spring portions 74a and 77a stop in their respective notches, they hold the carriage in position.

It is to be noted that the notched bar 76 may be removed and another such bar having differently spaced notches inserted. The bar 76 may have two sets of differently spaced notches on its opposite edges.

At the front of the frame members 51, is secured a chart holding frame member 78 having chart holding angle members 78a for holding in place the chart 79. On the lower side of the block 54 is secured an indicating pointer which moves with the carriage when the latter slides along the guides 52. As this movement takes place with the chart mounted, the operative may see exactly which letter or character may be brought into position opposite the openings 65a and 64b. It is to be noted that the spacing on the chart 79 follows that on the character sheet 62 and at the beginning of use, the registering indications on the chart 79 are adjusted to register with those of the character sheet 62.

The device is provided with an important feature where the light is projected below the lens 42. Essentially the projected light is received at a surface which is used for making a lay-out of the design to be accomplished; the lay-out being freely movable substantially in a plane normal to the lens axis, and there being a sensitized surface below the lay-out sheet—upon which the design of the lay-out sheet is photographically projected.

There are several modifications of the lay-out sheet support, which modifications will now be described.

In the modification illustrated in Figs. 9, 10, 11 and 12, a board or base member 80 has a bottom member 81 attached thereto which extends beyond the outer edge 80 for a sufficient distance to provide a space for a purpose to be presently explained. If desired, the parts 80 and 81 may be made integral as illustrated in Figs. 20 and 24. Around the outer edge of the bottom member 81 is an edging 82 which extends upwardly a sufficient distance to be slightly beyond the upper edge of the board 80; thus with the sides of the board 80 and the rim of the member 81, forming a slot 83. This slot 83 is painted with black non-reflecting paint for a purpose to be explained.

Hinged at two opposite sides of the edging 82 is a rod 83 which extends from one end of the slot 83 on that side, to the other end of the slot. On the ends of the rod 83 are knobs 84 for the purpose of turning the rod 83. Secured to the rod 83 is lay-out plate 85 which is painted inside with a black non-reflecting paint and which has turned-down edges 85a which extend into the slot 83 and thereby prevent passage of light when the lay-out plate 85 is in the position shown in Figs. 9 and 12.

In the construction illustrated in Figs. 13 and 14, the base member 86 is similar to the base member 80 and the bottom member 87 and the edging 88 are similar to their respective counterparts 81 and 82, already described. In this construction the lay-out plate is made in two halves in the form of plates 89, 90. These plates 89, 90 are similar to the plate 85 except that their adjacent edges are modified to coact with each other the adjacent edge of the plate 90 having no turned-down edge and that of the member 89 having an off-set portion 89a to overlap the edge of the plate 90.

A lay-out sheet upon which the lay-out is to be placed is illustrated in Fig. 9 and designated 91. Registering with the lay-out sheet 91 and suitably secured to the base 80, or 86, is a sensitized surface—as photographic paper 92.

In use, the whole unit described in either Figs. 9 to 12 or 13, 14, is moved about on the support 30 with the desired character being projected thereon, with the lay-out plate 85, or 89, 90, in closed position. When the projected character is in its proper place, the character or sufficient of its outline, is sketched, together with pencil indications of the positions of the registration marks 62b. When this is accomplished, the same is done for each desired character in its proper position. It is to be here noted that the characters can thus be properly spaced on the lay-out sheet, by judgement of the eye of the operative without the control of any mechanical means.

On completion of the lay-out, the unit is moved until the first character and its registration marks coincide with the pencil marks on the lay-out sheet. This completed, the knobs 84 are used to quickly lift the lay-out plate 80, or the plates 89, 90, thus exposing the sensitized surface 92 to the light source, projected as a character, a sufficient time for printing. After printing, the lay-out plate is closed and the process repeated for the respective characters. As the slot 83 between the edge 82, or 88 and the base 81 or 86 has non-reflecting walls, it will be clear that the sensitized paper 92 will be protected from the light when the lay-out plate is down. And since the registration indications are protected, as already described, these marks will not print on the sensitized surface.

In Figs. 15, 16 and 17, I illustrate further modifications of the invention. A table 100 is provided with rails 101 at two sides to provide for a space beneath. A flat bar 102 of sufficient length to extend beyond both sides of the table 100 is provided with spring members 103 held in place by rivets 104. The spring members 103 press against the underside of the table 100 and hold the bar 101 on its upper surface and in close contact therewith. This bar 101 may be placed in any one of many positions and used as a guide for any of the lay-out and printing units already described. These units will maintain the angle of the bar 102 and can be made to slide therealong as the lay-out and printing of successive letters or characters is carried out. By use of this bar, the placing of letters or characters at angle to their base line may be accomplished or a mechanical base line may be maintained.

In the drawing, I have shown the table 100 as covered with grid lines. These grid lines are useful in reproducing successive rows of characters showing the same characteristics. By use of the grid, the bar may be moved to another and parallel position when a new position is desired—in a well known manner.

This table 100 is provided with small drilled holes 100a as many as is found to be convenient. These holes are of a size to fit a small pin 105—see Fig. 16—which extends into the bottom of the lay-out and printing unit and is preferably located in the geometric center of the unit. This enables the operative to place the unit on the table with the pin 105 in a hole 100a and rotate the unit on the table, enabling the operative to place the letters or other characters in a circle. If desired, the pin 105 may be removable so that the lay-out and printing unit may be used in a manner described for the units illustrated in Figs. 9 to 14, inclusive.

In Figs. 18, 19, 20 and 21, is a modification which may be used with the table 100 and with any one of the units illustrated in Figs. 9 to 14, 16, 22 and 24. It may be found to be desirable to make a design placing the characters on the arc of a large circle. For this I provide a special means. On the bottom of any of these units as shown in Figs. 18, 19 and 20, a groove is made to receive the bar or strip 106 which is provided with a series of drilled holes 106a. These holes are of a size to receive the pin end 105a with a snug fit as illustrated in Figs. 20 and 21. The bar or strip 106 is held in its groove by the retaining strips 107 which are secured in place by suitable screws 107a. The bar 106 is held in any particular adjustment by a screw 108 which is placed through any one of a plurality of slits 106b and tightened after the proper adjustment is made. In the form of the unit illustrated in Fig. 20, I have shown the parts 80 and 81 (of Fig. 11) as integral, as heretofore suggested and I have designated this part as 180.

In practice, the pin end 105a of Fig. 21 would be made to register with an opening 106a of the bar 106 at any desired distance from the main body of the unit. The lower pin end 105b is then placed in registry with one of the holes 100a of the table 100. A flange 105c—see Figs. 21 and 22—may be provided to give stability to the pin ends 105a and 105b.

In Figs. 23 and 24 is illustrated another modification of the lay-out unit. The body portion 280 is cut away all around to provide a space 283 for the edges 285a of the lay-out plate 285. A rim 282 extends entirely around the outer periphery of the body portion 280, except that it is cut away to permit the ears 285b to reach a point near the bottom of the space 283. In using this form of the invention, the lay-out sheet 91 is placed upon the top of the cover 285 and the sensitized surface 92 is secured to the upper surface of the body member 280.

The construction and operation of the several parts of this device have been described. In operating the whole construction, the light source being on and the lay-out unit with a lay-out sheet 91 thereon being in place, the light is focused so as to make a sharp image on the lay-out sheet 91. By the knob 70, the desired letter or other character image is brought into position on the opening 64b. The lay-out frame is freely moved to bring the character in proper position. The astigmatizing lenses are now adjusted by means of the handles 47b, 48b to produce the desired results. By adjusting the head of the enlarging apparatus and focusing the same to produce a sharp image, the desired size of image is produced.

When in position, the indicated registration lines are marked on the lay-out sheet. This operation is repeated until the characters are all indicated on the lay-out sheet.

Return is now made to the first character and registration made by moving the lay-out unit on the support 38 or on the table 100. When the image registers with the lay-out, the operative, by the knob 84, lifts the cover 85 and the light prints the image on the sensitized surface 92. When printed a sufficient time, the cover 85 is lowered. The lay-out unit is now moved so as to bring another character image in registry with its registration marks. The operation is completed and repeated for the other characters until the whole design is completed. It has been found to be convenient to use a negative having transparent letters or characters on a dark background.

While I have illustrated and described a form of my invention in detail, I desire to have it understood that the disclosure is merely illustrative and that modifications and changes may be made without departing from the spirit of the invention and within its scope as claimed.

Having described my invention, what I claim is:

1. In a photographic lettering device having a source of light and an enlarging camera including a negative-holder carrying frame, guide means carried by the frame, a carriage means mounted to move along the guide means, a second guide means mounted on the carriage means and extending at substantially 90° to the first guide means, a movable multiple-character negative holder on the second guide means, a single finger-operative member for bodily moving the carriage along the first named guide means, the said finger-operative means being mounted to rotate in a bearing on the carriage means, rotative operative connections between the finger-operative means and the negative holder to move the holder along the second guide means when the finger-operative means is rotated, and coacting means supported by the carriage and frame, respectively, for indicating, by clicking, the proper printing positions of the characters of the negative, whereby, when in use, the operator may, by the use of one hand on the finger-operative means, bring any character or properly spaced line of characters of the negative into proper printing position.

2. In a photographic lettering device having a source of light and an enlarging camera including a negative-holder carrying frame, guide means carried by the frame, a carriage means mounted to move along the guide means, a second guide means mounted on the carriage means and extending at substantially 90° to the first guide means, a movable multiple-character negative holder on the second guide means, a single finger-operative member for bodily moving the carriage along the first named guide means, the said finger-operative means being mounted to rotate in a bearing on the carriage means, rotative operative connections between the finger-operative means and the negative holder to move the holder along the second guide means when the finger-operative means is rotated, and coacting means supported by the carriage and frame, respectively, for indicating, by clicking, the proper printing positions of the characters of the negative, said coacting means including a removable bar provided with clicking means spaced in accordance with the spacing of the characters of the particular negative to be used, whereby, when in use, the operator may, by the use of one hand on the finger-operative means, bring any character or properly spaced line of characters of the negative into proper printing position.

3. In a photographic lettering device having a source of light and an enlarging camera including a negative-holder carrying frame, guide means carried by the frame, a carriage means mounted to move along the guide means, a second guide means mounted on the carriage means and extending at substantially 90° to the first guide means, a movable multiple-character negative holder on the second guide means, a single finger-operative member for bodily moving the carriage along the first named guide means, the finger-operative means being mounted to rotate in a bearing on the carriage means, an arm on the finger-operative means and a link having its ends connected to the arm and to the negative holder, respectively, to move the holder along the second guide means when the finger-operative means is rotated, and coacting means supported by the carriage and frame, respectively, for indicating, by clicking, the proper printing positions of the characters of the negative, whereby, when in use, the operator may, by the use of one hand on the finger-operative means, bring any character or a plurality of properly spaced lines of characters of the negative into proper printing position.

GEORGE A. LOHR.

REFERENCES CITED

The following references are of record in the file of this patent:

UNITED STATES PATENTS

| Number | Name | Date |
| --- | --- | --- |
| 1,079,402 | Cornwall | Nov. 25, 1913 |
| 1,776,527 | Uher | Sept. 23, 1930 |
| 1,805,333 | Hunter | May 12, 1931 |
| 1,893,439 | Ogden | Jan. 3, 1933 |
| 1,949,067 | Wheelock et al. | Feb. 27, 1934 |
| 1,980,287 | Ogden | Nov. 13, 1934 |
| 1,986,693 | Uher | Jan. 1, 1935 |
| 2,010,561 | Ogden | Aug. 6, 1935 |
| 2,036,000 | Uher | Mar. 31, 1936 |
| 2,160,750 | Meyer | May 30, 1939 |
| 2,167,298 | Hardy | July 25, 1939 |
| 2,168,503 | Williamson | Aug. 8, 1939 |
| 2,260,561 | Cuendent | Oct. 28, 1941 |
| 2,280,096 | Morrison | Apr. 21, 1942 |
| 2,334,541 | Bumstead | Nov. 16, 1943 |
| 2,348,457 | Drehs | May 9, 1944 |
| 2,356,620 | Schade | Aug. 22, 1944 |
| 2,369,980 | Reyniers | Feb. 2, 1945 |